Jan. 16, 1934.  S. M. UDALE  1,943,641

BRAKE DRUM

Filed July 26, 1930

Inventor

Stanley M. Udale

Patented Jan. 16, 1934

1,943,641

UNITED STATES PATENT OFFICE 1,943,641

BRAKE DRUM

Stanley M. Udale, Detroit, Mich., assignor, by mesne assignments, to Erb-Joyce Foundry Company, Detroit, Mich., a corporation of Michigan Application July 26, 1930. Serial No. 471,004

4 Claims. (Cl. 188—218)

This invention relates to brake drums for motor vehicles.

The object of this invention is to permit the brake drum to expand under the action of heat without distortion so that the brake drum remains truly cylindrical.

Brake drums of the prior art have been defective in that they assume the conical form.

The second object of this invention is to construct in one piece a brake drum which will remain cylindrical instead of using a two or three piece construction as has been done heretofore.

The final object of this invention is to utilize the recently available (due to the introduction of electric furnaces) cast iron having high tensile strength and excellent wearing qualities. This cast iron has also the ability to withstand a moderate amount of heat and is intermediate in its qualities between malleable iron and ordinary gray iron, having the wearing qualities of the latter and the strength of the former.

Figure 1:
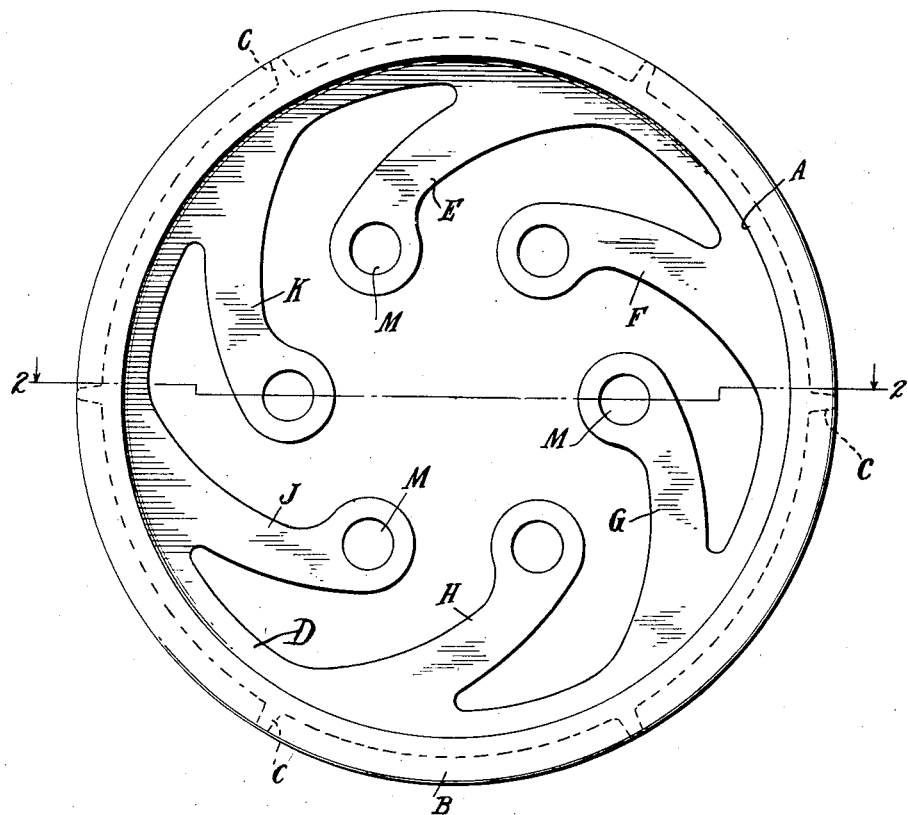
Figure 1 shows the brake drum in elevation.
Figure 2:
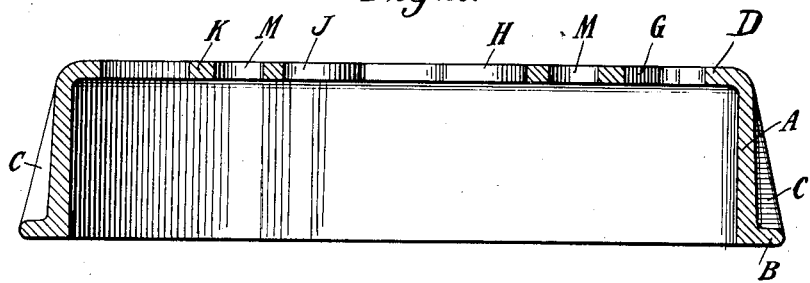
Figure 2 shows a cross section on plane 2—2 of Figure 1.

In the figures, A refers to the brake drum proper; B is a stiffening flange on the open end; and CC are a number of ribs connecting the flange B with the drum A.

The drum A is provided with a flange D on its inner edge. Extending from this flange D are the arms E, F, G, H, J, K. These arms are provided with bolt holes MM at their inner ends. These bolt holes are the means whereby the drum is supported on the hub of the wheel.

Operation

When this brake drum is in use, the drum A expands and the tendency of the hub to remain cooler than the drum causes the holes MM to remain in the position shown. The effect of this is to place a strain between M and the drum A. By making the arms E, F, G, H, J, K, of the shape shown, and reenforcing the drum A by the flanges B and D and the rib C, the tendency of the strain exerted by the bolt holes MM to distort the drum A is resisted and the drum A remains substantially cylindrical.

What I claim is:

1. A one-piece internal cast iron brake drum for motor vehicles comprising a braking, cylindrical portion having yieldable arms cast integral therewith, means at the inner ends of said arms for supporting said brake drum.

2. A one piece internal cast iron brake drum for vehicles comprising a ring providing a cylindrical braking surface and a flange extending therefrom, bolt holes in said flange, said flange being cut away between the bolt holes substantially up to said ring, external cooling means distributed over the outside of said ring and concentrated toward the open end thereof so as to counteract the tendency of said cylindrical braking surface to become bell mouthed.

3. A one piece internal cast iron brake drum for vehicles including a ring providing a cylindrical braking surface and an inwardly directed flange portion provided at the inner edge thereof with openings for the reception of securing means, said flange portion being cut away between said openings towards and approximately to said ring.

4. An integral cast metal drum for internal brakes including a ring providing an internal cylindrical braking surface and a radially inwardly directed flange portion having openings for securing means adjacent the radially inner edge thereof, said flange portion being cut away between said openings whereby to form arms of a length greater than the radial distance between the inner ends thereof and said surface.

STANLEY M. UDALE.